(12) United States Patent
Kayano et al.

(10) Patent No.: US 9,545,910 B2
(45) Date of Patent: Jan. 17, 2017

(54) CONTROL APPARATUS FOR ELECTRIC VEHICLE

(71) Applicant: HONDA MOTOR CO., LTD., Minato-ku, Tokyo (JP)

(72) Inventors: Morio Kayano, Wako (JP); Daishi Igarashi, Wako (JP); Suguru Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/842,646

(22) Filed: Mar. 15, 2013

(65) Prior Publication Data

US 2013/0244828 A1 Sep. 19, 2013

(30) Foreign Application Priority Data

Mar. 19, 2012 (JP) .................. 2012-062828

(51) Int. Cl.
| | |
|---|---|
| *B60W 10/08* | (2006.01) |
| *B60W 10/26* | (2006.01) |
| *B60L 3/00* | (2006.01) |
| *B60L 11/18* | (2006.01) |
| *B60W 10/28* | (2006.01) |

(52) U.S. Cl.
CPC ............ *B60W 10/08* (2013.01); *B60L 3/00* (2013.01); *B60L 11/1838* (2013.01); *B60L 11/1885* (2013.01); *B60W 10/26* (2013.01); *B60W 10/28* (2013.01); *B60Y 2400/214* (2013.01); *Y02T 10/7072* (2013.01); *Y02T 90/121* (2013.01); *Y02T 90/128* (2013.01); *Y02T 90/14* (2013.01);

(Continued)

(58) Field of Classification Search
CPC .......................... B60W 10/24; B60W 10/26
See application file for complete search history.

(56) References Cited

U.S. PATENT DOCUMENTS 5,659,240 A * 8/1997 King ............................ 320/134
6,107,691 A 8/2000 Gore et al.
(Continued)

FOREIGN PATENT DOCUMENTS

| CN | 101379669 A | 3/2009 |
|---|---|---|
| CN | 101682202 A | 3/2010 |

(Continued)

OTHER PUBLICATIONS

Search Report issued in German Patent Application No. 10 2013 204 625.1, dated May 21, 2013, 10 pages.
(Continued)

*Primary Examiner* — Erez Gurari
(74) *Attorney, Agent, or Firm* — Westerman, Hattori, Daniels & Adrian, LLP

(57) ABSTRACT

An ECU selects a power supply mode which controls a power supply to an inverter apparatus, in a case where a fuel cell vehicle is instructed to start-up by an ignition switch and it is detected that a power supply inlet and a power supply connector are fitted together based on voltage of CONNECT signal, and selects a driving mode which controls the driving of the fuel cell vehicle, in a case where the fuel cell vehicle is instructed to start-up by the ignition switch and it is detected that the power supply inlet and the power supply connector are not fitted together based on voltage of CONNECT signal.

5 Claims, 2 Drawing Sheets

(52) U.S. Cl.
CPC ............... *Y02T 90/163* (2013.01); *Y02T 90/34* (2013.01); *Y10T 477/30* (2015.01)

(56) References Cited

U.S. PATENT DOCUMENTS

2010/0116571 A1* 5/2010 Suzuki .................. 180/65.25
2011/0048826 A1* 3/2011 Starr .................... 180/65.51
2011/0077809 A1   3/2011 Leary

FOREIGN PATENT DOCUMENTS

| CN | 102282036 A | 12/2011 |
|---|---|---|
| EP | 2236345 A8 | 5/2011 |
| EP | 2 557 745 A1 | 2/2013 |
| JP | 7-39012 A | 2/1995 |
| JP | 2001-008380 A | 1/2001 |
| JP | 2004-187329 A | 7/2004 |
| JP | 2006-320065 A | 11/2006 |
| JP | 2010-035277 A | 2/2010 |
| JP | 2010-273427 A | 12/2010 |
| JP | 2011-125185 A | 6/2011 |
| JP | 2011-234536 A | 11/2011 |
| WO | WO 2011/125214 A1 | 10/2011 |

OTHER PUBLICATIONS

Japanese Office Action issued in Application No. 2012-062828, mailed Nov. 19, 2013, 6 pages.

Chinese Office Action dated Dec. 3, 2014, issued in corresponding Chinese Application No. 201310083763.2; w/ English translation. (13 pages).

Notice of Allowance dated Jun. 17, 2014, issued in corresponding Japanese Patent Application No. 2012-062828, with English Translation (6 pages).

* cited by examiner

CONTROL APPARATUS FOR ELECTRIC VEHICLE

CROSS-REFERENCE TO RELATED APPLICATION

Priority is claimed on Japanese Patent Application No. 2012-062828, filed on Mar. 19, 2012, the content of which is incorporated herein by reference.

BACKGROUND

1. Field of the Invention

The present invention relates to a control apparatus for an electric vehicle.

2. Description of Related Art

In the related art, a vehicle is known, in which, for example, in a case where a charging cable is connected to the vehicle, a pilot signal is output from the charging cable to a control apparatus of the vehicle, the control apparatus of the vehicle which obtains the pilot signal recognizes which operation is required to be performed between charging the vehicle from an external apparatus and power supplying to the external apparatus from the vehicle, and either charging or a power generation operation is performed according to a recognized result (for example, refer to PCT International Publication No. WO 2011-125214).

SUMMARY

According to the vehicle in the related art described above, there occurs a problem in that a cost needed for configuring an apparatus is increased since it is necessary to prepare predetermined equipment (circuit) outside the vehicle, which outputs a signal requesting for charging or power supplying to the vehicle, along with a signal circuit for inputting the signal from the predetermined equipment (circuit) to the vehicle.

An aspect according to the present invention is made in view of the above-described circumstances, and an object thereof is to provide a control apparatus for an electric vehicle which is capable of independently and integrally controlling outward power supply without requiring external equipment or an apparatus, by preventing the cost for configuring an apparatus from increasing.

An aspect according to the present invention includes the following means for achieving the object related to solving the problems.

(1) A control apparatus for an electric vehicle according to an aspect of the invention includes: a power source, a drive motor driven by power from the power source, a switch which is provided inside the electric vehicle and instructs the electric vehicle to start-up, a fitting detection device which detects whether a power supply inlet of the electric vehicle which is connected to the power source and a power supply connector which is capable of supplying the power from the power source to an equipment outside the vehicle are fitted together or not and a control device. The control device includes a mode switching device which selects a power supply mode which controls a power supply to the equipment, in a case where the electric vehicle is instructed to start-up by the switch and the fitting detection device detects that the power supply inlet and the power supply connector are fitted together, and which selects a driving mode which controls a driving of the electric vehicle, and in a case where the electric vehicle is instructed to start-up by the switch and the fitting detection device detects that the power supply inlet and the power supply connector are not fitted together.

(2) In the aspect of (1), the control apparatus for the electric vehicle may include an outward power supply contactor which is capable of cutting off the connection between the power source and the equipment.

(3) In the aspect of (1) or (2), the control apparatus for the electric vehicle may include a control power supply device which supplies a control power which actuates a power control device which controls a power supply from the power supply connector to the equipment.

According to the aspect of (1), it is possible to independently control the power supply to the equipment outside the vehicle without requiring appropriate equipment or an apparatus outside the vehicle, by a combined use of a signal system configured by the switch and the like which are used for the start-up of the vehicle. As a result, it is possible to prevent the cost for configuring the apparatus from increasing, and for example, with respect to a power generating power source, it is also possible to automatically stop the power generation when the power supply to the equipment outside the vehicle has finished and thus it is possible to prevent unnecessary power generation.

In addition, since the power supply to the equipment outside the vehicle can be integrally and intensively controlled by the control apparatus for the electric vehicle, it is possible to quickly and easily stop the power supply under abnormal conditions, and since a starting process and a finishing process of the power supplying can be simplified, it is possible to prevent a potential erroneous operation.

According to the aspect of (2), it is possible to quickly and accurately stop the power supply under abnormal conditions, by controlling the outward power supply contactor using the control apparatus of the electric vehicle.

According to the aspect of (3), it is possible to quickly and accurately stop the operation of the power control device under abnormal conditions, by controlling the control power supply device using the control apparatus of the electric vehicle.

DESCRIPTION OF THE EMBODIMENT

Hereinafter, a control apparatus for an electric vehicle according to an embodiment of the present invention will be described in reference to the accompanying drawings.

Figure 1:
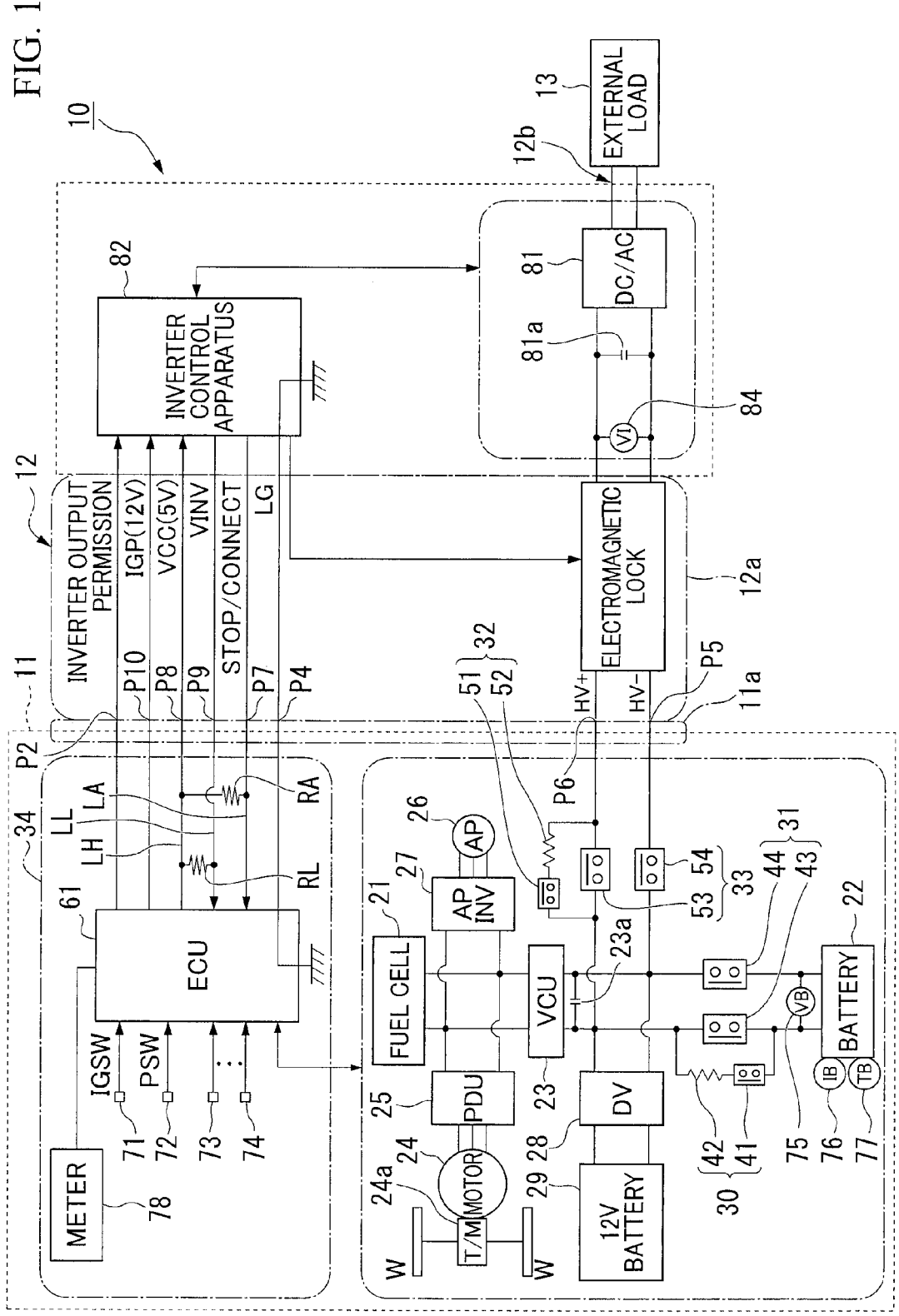
FIG. 1 is a configuration diagram illustrating a power supply system in an embodiment of the present invention.

The control apparatus for the electric vehicle according to the present embodiment, for example, as illustrated in FIG. 1, is installed in a fuel cell vehicle (an electric vehicle) 11 which configures a power supply system 10. The power supply system 10 is configured to include, for example, the fuel cell vehicle 11 and an inverter apparatus (an equipment) 12 which is provided separately from the fuel cell vehicle 11, and supplies power with respect to an external load 13 such as external AC equipment or the like.

Then, the control apparatus for the electric vehicle according to the aspect of the embodiment, for example, is a control apparatus 34 which is installed in the fuel cell vehicle 11.

The fuel cell vehicle 11, for example, includes a power supply inlet 11a which is connected to a power source of the fuel cell vehicle 11 in a trunk room or the like on the rear part of the vehicle, and the inverter apparatus 12 can be installed in the trunk room or the like.

The inverter apparatus 12 includes, for example, a power supply connector 12a which is detachably attached and fitted to the power supply inlet 11a provided in the fuel cell vehicle 11.

Then, the power supply connector 12a, as described below, includes multiple connector pins that are electrically connectable to multiple terminals provided in the power supply inlet 11a.

The power supply inlet 11a of the fuel cell vehicle 11 and the power supply connector 12a of the inverter apparatus 12 are fitted together, and as a result of such a fitting, the fuel cell vehicle 11 and the inverter apparatus 12 are electrically connected in such a manner that the multiple connector pins of the power supply connector 12a is connected to the multiple terminals of the power supply inlet 11a.

In addition, the inverter apparatus 12 includes, for example, a power output unit 12b to which the external load 13 can be electrically connected and can convert DC power of the fuel cell vehicle 11, which is input from the power supply connector 12a, into AC power. Then, the inverter apparatus 12 can supply the converted AC power to the external load 13 from the power output unit 12b.

The fuel cell vehicle 11 is configured to include, for example, a fuel cell stack (a power source) 21, a battery (a power source) 22, a voltage control unit (VCU) 23, a drive motor 24, a power drive unit (PDU) 25, an air pump 26, an air pump inverter (APINV) 27, a downverter (DV) 28, a 12V battery 29, a battery pre-charge unit 30 and a battery contactor unit 31, an outward power supply pre-charge unit 32 and an outward power supply contactor unit 33, and a control apparatus 34.

The fuel cell stack 21 is configured, for example, such that a solid polymer electrolyte membrane made from a cation exchange membrane, an electrolyte electrode structure formed by being interposed between a fuel electrode (an anode) formed from an anode catalyst and gas diffusion layer, and an oxygen electrode (a cathode) formed from a cathode catalyst and gas diffusion layer, and additionally a fuel cell formed by being interposed between a pair of separators are stacked to form multiple combination layers. Then, the stacked body of the fuel cell is sandwiched by a pair of end plates from both ends in the stacking direction.

Air which is oxidant gas (reactive gas) containing oxygen can be supplied from the air pump 26 to the cathode of the fuel cell stack 21, and fuel gas (reactive gas) containing hydrogen can be supplied from a high pressure hydrogen tank or the like (not illustrated) to the anode.

Then, when the reactive gas is supplied, the hydrogen which is ionized due to a catalytic reaction on the anode catalyst of the anode moves to the cathode via the moderately humidified solid polymer electrolyte membrane, and an electron generated by such a movement is drawn out to an external circuit, to generate DC power. During the process, at the cathode, water is produced by a reaction of the hydrogen ion, electron and oxygen.

The battery 22 is, for example, a high-voltage lithium ion type secondary battery and is connected to the fuel cell stack 21 via the voltage control unit 23.

The voltage control unit 23 includes, for example, a DC-DC converter or the like, and performs a voltage control with respect to an exchange of electric power between the fuel cell stack 21 and the battery 22.

In addition, the voltage control unit 23 includes, for example, a smoothing capacitor 23a at the battery 22 side.

The drive motor 24 is, for example, a DC brushless motor with a three-phase of U-phase, V-phase and W-phase and can perform a power driving operation or a power generation operation in response to a control by the power drive unit 25.

For example, the drive motor 24 performs the power driving operation by conducting electricity of an AC phase-current to each phase-coil and drives a driving wheel W via a transmission (T/M) 24a. Further, when the fuel cell vehicle 11 decreases the speed or the like, the drive motor 24 performs the power generation operation (regenerating operation) by a transferred driving power from the driving wheel side and outputs the generated power (regenerated power).

The power drive unit 25 is, for example, configured to include an inverter with a pulse width modulation (PWM) in which a bridge circuit formed by a bridge connection using multiple switching elements such as a transistor and a smoothing capacitor are provided.

The inverter, for example, when the drive motor 24 performs the power driving operation, switches each switching element on (conductive) and/or off (cut-off) which forms a pair for each phase, based on a PWM signal output from the control apparatus 34. As a result, the inverter converts DC power supplied from the battery 22 via the voltage control unit 23 or DC power supplied from the fuel cell stack 21, into a 3-phase AC power and conducts each AC phase-current by sequentially commutating the phase-current conduction to each phase-coil in the drive motor 24.

On the other hand, for example, when the drive motor 24 performs the power generation operation, the inverter switches each switching element on (conductive) and/or off (cut-off) in response to a gate signal synchronized based on a rotation angle of a rotor in the drive motor 24 and converts generated AC power output from the drive motor 24 into DC power.

The air pump 26, for example, is an electric compressor that includes an air pump motor (not illustrated) which is rotationally driven by AC power output from the air pump inverter 27, compresses the air taken from the outside, and supplies the compressed air to the cathode of the fuel cell stack 21 as reactive gas.

The air pump inverter 27, for example, is a PWM inverter or the like using a pulse width modulation (PWM), causes the air pump motor of the air pump 26 to be rotationally driven by DC power supplied from the battery 22 via the voltage control unit 23 or DC power supplied from the fuel cell stack 21, based on the control signal output from the control apparatus 34, and controls the number of rotations of the air pump motor.

The downverter 28, for example, includes a DC-DC converter or the like, lowers a high voltage between the terminals of the battery 22 or a high voltage applied from the fuel cell stack 21 via the voltage control unit 23, to a predetermined low voltage (12V), and charges the 12V battery 29 using the lowered power of predetermined voltage.

The 12V battery 29, for example, outputs a predetermined low voltage power for driving the electric load configured by the control apparatus 34 and various auxiliary equipments.

The battery pre-charge unit 30 and the battery contactor unit 31, for example, are provided between the battery 22, and the voltage control unit 23 and the downverter 28.

The battery pre-charge unit 30, for example, is configured by a pre-charge contactor 41 and a pre-charge resistor 42 which are serially connected to each other.

The battery contactor unit 31, for example, is configured by a positive electrode side battery contactor 43 which is connected to a positive terminal of the battery 22 in a positive electrode side high voltage line (HV +) of the fuel cell vehicle 11, and a negative electrode side battery contactor 44 which is connected to a negative terminal of the battery 22 in a negative electrode side high voltage line (HV −) of the fuel cell vehicle 11.

Then, the battery pre-charge unit 30 is connected to both ends of the positive electrode side battery contactor 43 (that is, parallel to the positive electrode side battery contactor 43).

The outward power supply pre-charge unit 32 and the outward power supply contactor unit 33, for example, are provided between the battery pre-charge unit 30 and the battery contactor unit 31, and the power supply inlet 11a.

The outward power supply pre-charge unit 32, for example, is configured by a pre-charge contactor (an outward power supply contactor) 51 and a pre-charge resistor 52 which are serially connected each other.

The outward power supply contactor unit 33, for example, is configured by a positive electrode side outward power supply contactor (an outward power supply contactor) 53 which is connected to the positive electrode side battery contactor 43 in the positive electrode side high voltage line (HV +) of the fuel cell vehicle 11, and a negative electrode side outward power supply contactor (an outward power supply contactor) 54 which is connected to the negative electrode side battery contactor 44 in the negative electrode side high voltage line (HV −) of the fuel cell vehicle 11.

Then, the outward pre-charge unit 32 is connected to both ends of the positive electrode side outward power supply contactor 53 (that is, parallel to the positive electrode side outward power supply contactor 53).

Each of the contactors 41, 43, 44, 51, 53 and 54 can switch each conductive path on and off, based on the control signal output from the control apparatus 34.

The control apparatus 34, for example, includes an ECU (Electronic Control Unit) 61 which is configured by an electronic circuit such as a CPU (Central Processing Unit) or the like.

The ECU 61 (a fitting detection device, a control device, a mode switching device, a control power supply device), for example, controls the power driving operation and the power generation operation of the drive motor 24 by controlling a power conversion operation of the power drive unit 25.

For example, the ECU 61 calculates a target torque of the drive motor 24, based on signals output from various sensors and switches or the like, and performs a feedback control with respect to a conductive current into the drive motor 24 by matching an actual output torque from the drive motor 24 with the target torque.

The ECU 61, for example, controls a supply of reactive gas to the fuel cell stack 21 and amount of power generation of the fuel cell stack 21 by controlling the power conversion operation of the air pump inverter 27, an opening and closing of various valves provided on a flow channel for the reactive gas, and a voltage control operation of the voltage control unit 23 or the like.

The ECU 61, for example, performs control such as a monitoring and protection of a high voltage electric system including the battery 22, based on the output signals from various sensors and switches and further an output signal from an inverter control apparatus (a power control device) 82.

For example, the ECU 61 controls a driving status of the fuel cell vehicle 11, based on various instruction signals from an ignition switch 71 and a power switch 72 or the like, and based on various detection signals from a speed sensor 73, an accelerator pedal opening degree sensor 74 and a brake pedal switch (not illustrated) or the like.

Furthermore, the ignition switch 71 outputs an instruction signal (IGSW) which instructs a start-up or stop of the fuel cell vehicle 11 in response to an operation of a driver.

In addition, the power switch 72 outputs an instruction signal (PSW) which instructs a start-up (for example, a start-up of the air pump 26 or the like) of the fuel cell stack 21 in response to the operation of a driver.

In addition, the speed sensor 73 detects a speed of the fuel cell vehicle 11.

In addition, the accelerator pedal opening degree sensor 74 detects a stroke amount of an accelerator pedal (accelerator opening degree) in response to a driver's accelerator pedaling.

In addition, the brake pedal switch detects the presence or absence of the brake pedal operation of the driver.

In addition, the ECU 61, for example, calculates various quantities of states such as a remaining capacity SOC (State Of Charge) or the like, based on each detected signal from sensors such as a battery voltage sensor 75 which detects a voltage between terminals of the battery 22 (battery voltage) VB, a battery current sensor 76 which detects a current IB, and a battery temperature sensor 77 which detects a temperature TB.

Then, the ECU 61 controls the charging and discharging of the battery 22 by controlling the conduction or cut-off of the battery pre-charge unit 30 and the battery contactor unit 31, based on the calculated various quantities of states.

Furthermore, a meter 78 that is formed of gauges which display various states of the fuel cell vehicle 11, is connected to the ECU 61, along with various sensors, switches and the like.

Furthermore, as described later, the ECU 61 controls the power supply to the inverter apparatus 12 connected to the fuel cell vehicle 11 and the power conversion operation of the inverter apparatus 12, and detects the presence or absence of abnormality of the inverter apparatus 12.

For example, the ECU 61 controls the power supply to the inverter apparatus 12 by controlling the conduction and cut-off of the outward power supply pre-charge unit 32 and the outward power supply contactor unit 33.

The inverter apparatus 12, for example, is configured to include at least one or more inverters 81 and an inverter control apparatus 82.

The inverter 81, for example, is configured to include a bridge circuit formed by a bridge connection using multiple switching elements such as a transistor or the like and a smoothing capacitor, and switches each switching element on (conductive) and/or off (cut-off) based on the switching instruction signal output from the inverter control apparatus 82. As a result, the inverter 81 converts DC power which is supplied from the power source (for example, the fuel cell stack 21 and the battery 22) of the fuel cell vehicle 11 via the power supply connector 12a fitted to the power supply inlet 11a provided in the fuel cell vehicle 11, into AC power, and the converted AC power can be supplied to the external load 13.

In addition, the inverter 81, for example, is connected to the outward power supply contactor unit 33 via a smoothing capacitor 81a.

The inverter control apparatus 82, for example, is operated by a control power supplied from the ECU 61 of the fuel cell vehicle 11 and controls the power supply to the external load 13 by controlling the power conversion operation of the inverter 81 and the operation of an electromagnetic lock 83 of the power supply connector 12a in response to various instruction signals output from the ECU 61.

In addition, the inverter control apparatus 82, for example, outputs a signal of information relating to the state of the inverter apparatus 12, (for example, a VINV signal of the inverter voltage described later) based on a detected signal from an inverter voltage sensor 84 which detects an input voltage to the inverter 81 (inverter voltage VI).

The inverter control apparatus 82, for example, includes terminals that are connected to connector pins P1 to P10, which are provided in the power supply connector 12a, a terminal connected to an input terminal P11 of an electromagnetic lock 83 which supplies power for driving the electromagnetic lock 83 of the power supply connector 12a, and a terminal connected to an output terminal P12 of a disconnection detection circuit (not illustrated) or the like which is provided in the power supply connector 12a.

In addition, the power supply inlet 11a of the fuel cell vehicle 11 includes terminals that are connected to the connector pins P1 to P10 of the power supply connector 12a, and the ECU 61 of the control apparatus 34 includes terminals that are connected to terminals of the power supply inlet 11a, via an appropriate signal line.

In addition, the connector pin P2 of the power supply connector 12a, for example, is used in supplying an inverter output permission signal which is output from the ECU 61 of the control apparatus 34 to the inverter control apparatus 82, in other words, an instruction signal which permits power from the inverter apparatus 12 to be output to the external load 13.

In addition, the connector pin P4 of the power supply connector 12a, for example, is used in supplying an LG signal which indicates an electric potential grounded in the ECU 61 of the control apparatus 34 and the inverter control apparatus 82, in other words, an instruction signal which permits or prohibits the power supply from the fuel cell vehicle 11 to the inverter apparatus 12.

In addition, the connector pin P5 of the power supply connector 12a, for example, is connected to the negative electrode side high voltage line (HV −) of the power source (for example, the fuel cell stack 21, the battery 22 and the like) of the fuel cell vehicle 11 and is used in supplying the high voltage power of the negative electrode side from the fuel cell vehicle 11 to the inverter apparatus 12.

In addition, a connector pin P6 of the power connector 12a, for example, is connected to the positive electrode side high voltage line (HV +) of the power source (for example, the fuel cell stack 21 and the battery 22 and the like) of the fuel cell vehicle 11 and is used in supplying the positive electrode side high voltage power from the fuel cell vehicle 11 to the inverter apparatus 12.

In addition, the connector pin P7 of the power supply connector 12a, for example, is used in supplying a STOP/CONNECT signal (hereafter simply called CONNECT signal) output from the inverter control apparatus 82 to the ECU 61 of the control apparatus 34, in other words, a fitting signal which indicates whether the power supply inlet 11a and the power supply connector 12a are fitted together or not.

In addition, the connector pin P8 of the power supply connector 12a, for example, is used in supplying a VCC signal output from the ECU 61 of the control apparatus 34 to the inverter control apparatus 82, in other words, a signal with a predetermined control voltage (5V) according to a control voltage supplied from the ECU 61 to the inverter control apparatus 82.

In addition, the connector pin P9 of the power supply connector 12a, for example, is used in supplying the VINV signal output from the inverter control apparatus 82 to the ECU 61 of the control apparatus 34, in other words, a signal with a voltage according to an inverter voltage (detected value) VI detected by the inverter voltage sensor 84.

In addition, the connector pin P10 of the power supply connector 12a, for example, is used in supplying an IPG signal output from the ECU 61 of the control apparatus 34 to the inverter control apparatus 82, in other words, a signal with a predetermined control voltage (12V) according to a control voltage supplied from the ECU 61 to the inverter control apparatus 82.

Furthermore, in the VCC signal, a predetermined control voltage is applied from the ECU 61 to the inverter control apparatus 82 using a VCC signal voltage line LH that is connected to the connector pin P8 which is in a connection state by the power supply inlet 11a and the power supply connector 12a being fitted together.

The predetermined control voltage (5V) of the VCC signal, for example, in the control apparatus 34 of the fuel cell vehicle 11, can be obtained by dividing the predetermined voltage (12V) depending on the power supplied from the 12V battery 29 for driving the control apparatus 34, into a voltage corresponding to a reference voltage of an A/D converter (not illustrated) provided in the inverter control apparatus 82.

In addition, in the VINV signal, a voltage according to the power supplying state from the fuel cell vehicle 11 to the inverter apparatus 12 is applied from the inverter control apparatus 82 to the ECU 61 using a VINV signal voltage line LL that is connected to the connector pin P9 which is in a connection state by the power supply inlet 11a and the power supply connector 12a being fitted together.

Furthermore, the VINV signal voltage line LL, for example, in the control apparatus 34 of the fuel cell vehicle 11, is connected to the VCC signal voltage line LH by a predetermined pull-up resistor RL.

Figure 2:
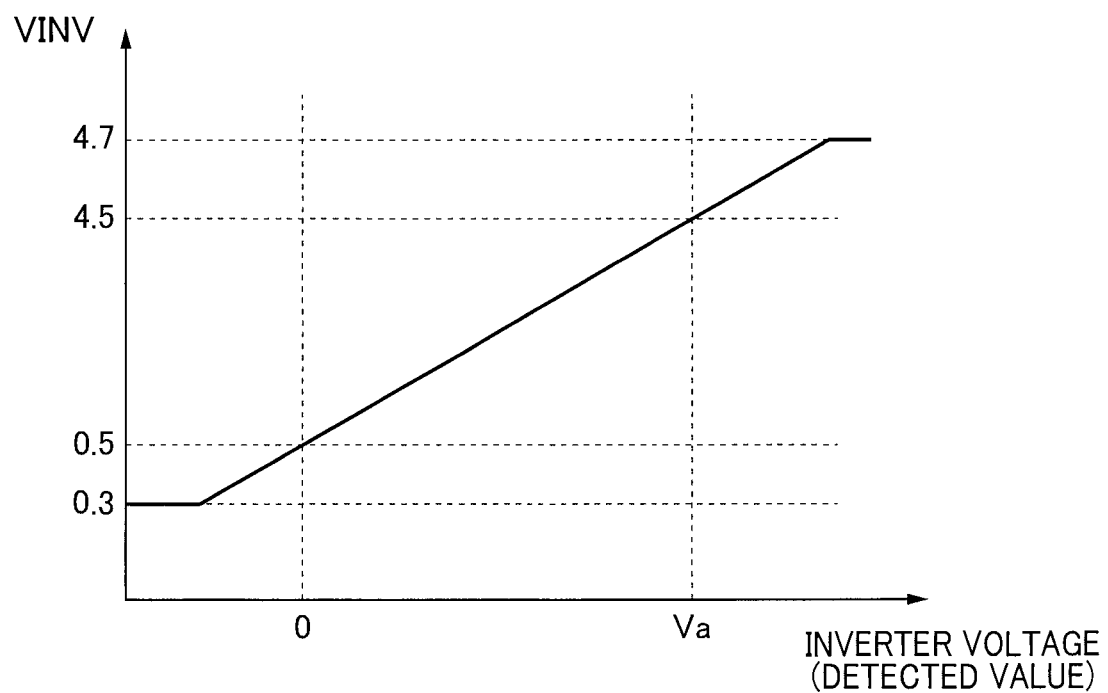
FIG. 2 is a graph illustrating a corresponding relationship between an inverter voltage (a detected value) VI which is detected by an inverter voltage sensor and a voltage of a VINV signal which is obtained in an ECU, in the power supply system in an embodiment of the present invention.

In addition, the voltage of the VINV signal, for example, as illustrated in FIG. 2, in the control apparatus 34 of the fuel cell vehicle 11, can be obtained by dividing the predetermined control voltage (5V) of the VCC signal into a voltage according to the power supplying state from the fuel cell vehicle 11 to the inverter apparatus 12, for example, the inverter voltage (detected value) VI.

For example, in the state where the power supply inlet 11a and the power supply connector 12a are normally fitted together, in a case where the inverter voltage (detected value) VI is in a normal voltage range of zero to maximum voltage Va, the voltage of the VINV signal obtained in the ECU 61 is in the voltage range of 0.5 (V) to 4.5 (V).

In addition, for example, as shown in TABLE 1 below, in a case where high voltage lines of the positive electrode and a negative electrode (HV +, HV −) between the power supply inlet 11a and the power connector 12a are not connected to each other (unfitted), or in a case where a disconnection occurs in the VINV signal voltage line LL in the inverter apparatus 12, the inverter voltage sensor 84 or the like, the voltage of the VINV signal obtained in the ECU 61 becomes equal to the predetermined control voltage (5V) of the VCC signal.

In addition, for example, in a case where there occurs a short circuit between high voltage lines of the positive electrode and a negative electrode (HV +, HV −) between the power supply inlet 11a and the power connector 12a or in a case when there occurs a short circuit in the inverter voltage sensor 84 or the like in the inverter apparatus 12, the voltage of the VINV signal obtained in the ECU 61 becomes zero.

TABLE 1

|  | FITTED | | UNFITTED | |
| --- | --- | --- | --- | --- |
|  | CONNECT [V] | VINV [V] | CONNET [V] | VINV [V] |
| CONNECT disconnected | 5 | 0.5 to 4.5 | 5 | 5 |
| CONNECT shorted | 0 | 0.5 to 4.5 | 0 | 5 |
| VINV disconnected | 1 to 4 | 5 | 5 | 5 |
| VINV shorted | 1 to 4 | 0 | 5 | 0 |
| short circuit | 0 | 0 | 0 | 0 |
| normal | 1 to 4 | 0.5 to 4.5 | 5 | 5 |

In addition, in the CONNECT signal, a voltage corresponding to the connection state of the CONNECT signal voltage line LA is applied from the inverter control apparatus 82 to the ECU 61, using a CONNECT signal voltage line LA that is connected to the connector pin P7 which is in a connection state by the power supply inlet 11a and the power supply connector 12a be fitted together.

In addition, the CONNECT signal voltage line LA, for example, in the control apparatus 34 of the fuel cell vehicle 11, is connected to the VCC signal voltage line LH by a predetermined pull-up resistor RA.

Then, for example, as shown in TABLE 1, in the control apparatus 34 of the fuel cell vehicle 11, the voltage of the CONNECT signal can be obtained by dividing the predetermined control voltage (5V) of the CONNECT signal into a voltage corresponding to the connection state of the CONNECT signal voltage line LA.

For example, in a case where the power supply inlet 11a and the power supply connector 12a are normally fitted together, the voltage of the CONNECT signal obtained in the ECU 61 is in the voltage range of 1 to 4 V.
In addition, for example, in a case where CONNECT signal voltage lines LA of the positive electrode and the negative electrode between the power supply inlet 11a and the power connector 12a are not connected to each other (unfitted), or in a case where a disconnection occurs in the CONNECT signal voltage line LA in the inverter apparatus 12, the voltage of the CONNECT signal obtained in the ECU 61 becomes equal to the predetermined control voltage (5V) of the VCC signal.

In addition, for example, in a case where there occurs a short circuit in the CONNECT signal voltage line LA, the voltage of the CONNECT signal obtained in the ECU 61 becomes zero.

In other words, for example, as shown in TABLE 1, in a case where there occurs a short circuit in the VINV signal and CONNECT signal (short circuit), each voltage of the VINV signal and the CONNECT signal obtained in the ECU 61 becomes zero.

The power supply system 10 according to the present embodiment includes the above configuration, and an operation of the power supply system 10, particularly an operation of the ECU 61 will be described.

The ECU 61, for example, selects a power supply mode which controls the power supply to the inverter apparatus 12 in a case where the fuel cell vehicle 11 is instructed to start-up by the ignition switch 71, and it is detected that the power supply inlet 11a and the power supply connector 12a are fitted together based on voltage at least either the VINV signal or the CONNECT signal.

In the power supply mode, the ECU 61, for example, performs an interlock which causes the fuel cell vehicle 11 to be in a driving halted state, at least by fixing a shift position of a transmission 24a to a parking position or by setting a torque of the drive motor 24 to a zero torque.

Furthermore, the ECU 61, for example, in the meter 78 or an appropriate lamp (not illustrated), turns on a warning lamp which indicates that the interlock is being performed.

Then, the ECU 61, for example, performs a power supply from the fuel cell vehicle 11 to the inverter apparatus 12 by switching each of the contactor 51, 53 and 54 from conduction to cut-off.

In addition, the ECU 61, for example, selects a driving mode which controls the drive of the fuel cell vehicle 11, in a case where the fuel cell vehicle 11 is instructed to start-up by the ignition switch 71, and it is detected that the power supply inlet 11a and the power supply connector 12a are not fitted together based on voltage at least one of the VINV signal and CONNECT signal.

In the driving mode, the ECU 61, for example, stops performing the interlock.

Then, the ECU 61, for example, stops the power supply from the fuel cell vehicle 11 to the inverter apparatus 12 by switching each of the contactor 51, 53 and 54 from conduction to cut-off.

As described above, according to the control apparatus of the electric vehicle in the present embodiment, it is possible to independently control the power supply to the inverter apparatus 12 without requiring appropriate equipment or an apparatus outside the fuel cell vehicle 11, by combinedly using a signal system configured by the ignition switch 71 which is used for a start-up of the fuel cell vehicle 11.

As a result, it is possible to prevent the cost needed for configuring the apparatus from increasing, and for example, with respect to the fuel cell stack 21, it is also possible to automatically stop the power generation when the power supply to the inverter apparatus 12 is finished and thus it is possible to prevent an unnecessary power generation.

In addition, since the power supply to the inverter apparatus 12 can be integrally and intensively controlled by the vehicle side control apparatus 34, it is possible to quickly and easily stop the power supply under abnormal conditions, and since a starting process and a finishing process of the power supplying can be simplified, it is possible to prevent a potential erroneous operation.

Furthermore, it is possible to stop the power supply under abnormal conditions, by controlling each of the contactor 51, 53 and 54 using the vehicle side control apparatus 34.

Furthermore, it is possible to quickly and accurately stop the power supply under abnormal conditions, by controlling the supply of the control power which is necessary for operating the inverter control apparatus 82 using the vehicle side control apparatus 34.

In addition, in the embodiment described above, although the fuel cell vehicle 11 is included in the power supply system 10. However, the invention is not limited thereto, and, for example, another electric vehicle such as a hybrid vehicle or the like instead of the fuel cell vehicle 11 may be provided.

Therefore, as a power source which supplies power to the inverter apparatus 12, in addition to the fuel cell stack 21 or the battery 22, a capacitor installed in an electric vehicle or a power generator driven by an internal combustion engine or the like may also be used.

What is claimed is:

1. An electric vehicle comprising:
   a power source;
   a drive motor driven by power from the power source;
   a switch which is provided inside the electric vehicle and instructs the electric vehicle to start-up;
   a power supply inlet which is connected to the power source;
   a separate equipment which is provided separately from the electric vehicle and has a power supply connector through which power is supplied from the power source as DC current to an external load as AC current;
   a fitting detection device which detects whether the power supply inlet and the power supply connector are fitted together or not; and
   a control device,
   wherein the control device includes a mode switching device
   which, by an instruction by the switch, selects a power supply mode that controls a power supply to the separate equipment, in a case where, when the electric vehicle is instructed to start-up by the switch provided inside the electric vehicle, the fitting detection device detects that the power supply inlet and the power supply connector are fitted together, and
   which, by an instruction by the switch, selects a driving mode that controls a driving of the electric vehicle, in a case where, when the electric vehicle is instructed to start-up by the switch provided inside the electric vehicle, the fitting detection device detects that the power supply inlet and the power supply connector are not fitted together.

2. The electric vehicle according to claim 1, further comprising:
   an outward power supply contactor which is capable of cutting off the connection between the power source and the separate equipment, and is provided at the power source side of the separate equipment as viewed from the power source to the external load.

3. The electric vehicle according to claim 1, further comprising:
   a control power supply device which supplies a control power which actuates a power control device which controls a power supply from the power supply connector to the separate equipment.

4. The electric vehicle according to claim 2, further comprising:
   a control power supply device which supplies a control power which actuates a power control device which controls a power supply from the power supply connector to the separate equipment.

5. The electric vehicle according to claim 4,
   wherein the outward power supply contactor is controlled by the control power supply device.

\* \* \* \* \*